US000001365H

United States Statutory Invention Registration [19]

[11] Reg. Number: H1365

Amspacker et al.

[43] Published: Nov. 1, 1994

[54] HYBRID GUN BARREL

[75] Inventors: Michael R. Amspacker, Niceville; Nunzio Zummo, Ft. Walton Beach; Duane Finello, Shalimar, all of Fla.

[73] Assignee: The United States of America as represented by the Secretary of the Air Force, Washington, D.C.

[21] Appl. No.: 194,998

[22] Filed: Feb. 4, 1994

[51] Int. Cl.[5] ..... F41A 21/04; F41A 21/18

[52] U.S. Cl. ..... 42/78; 42/76.02; 89/16

[58] Field of Search ..... 42/78, 76.02, 76.01; 89/15, 16, 14.05

[56] References Cited

U.S. PATENT DOCUMENTS

| | | | |
|---|---|---|---|
| 37,193 | 12/1862 | Alsop . | |
| 2,345,089 | 3/1944 | Born | 42/78 |
| 2,792,657 | 5/1957 | Slowtev | 42/76.02 |
| 2,866,412 | 12/1958 | Meyer et al. | 102/38 |
| 2,996,988 | 8/1961 | Kunz | 102/38 |
| 3,392,472 | 7/1968 | Barr | 42/76.01 |
| 3,525,172 | 8/1970 | Marshall et al. | 42/78 |
| 3,751,313 | 8/1973 | Benedetto et al. | 156/16 |
| 3,951,040 | 4/1976 | Ziemba | 89/14 |
| 4,048,480 | 4/1978 | Moscrip | 89/42 |
| 4,197,801 | 4/1980 | LaFever et al. | 102/38 |
| 4,220,089 | 9/1980 | Smith | 102/434 |
| 4,335,657 | 6/1982 | Bains | 102/433 |
| 4,411,569 | 6/1981 | Pizzola | 37/16 |
| 4,527,348 | 7/1985 | Brennan | 42/76 |
| 4,546,564 | 10/1985 | A'Costa | 42/76 |
| 4,570,529 | 2/1986 | A'Costa | 41/21 |
| 4,604,954 | 8/1986 | Clarke et al. | 102/34 |
| 4,660,312 | 4/1987 | A'Costa | 41/21 |
| 4,712,465 | 12/1987 | MacDonald | 41/17 |
| 4,938,145 | 2/1988 | Martwick | 102/434 |
| 5,004,529 | 4/1991 | Vishnitsky | 204/212 |

FOREIGN PATENT DOCUMENTS

| | | | |
|---|---|---|---|
| 615566 | 1/1927 | France | 42/78 |
| 353197 | 12/1937 | Italy | 42/76.01 |
| 353816 | 12/1937 | Italy | 42/76.01 |
| 444914 | 2/1949 | Italy | 42/78 |
| 595160 | 6/1959 | Italy | 42/76.01 |
| 926 | of 1887 | United Kingdom | 42/78 |

*Primary Examiner*—Stephen M. Johnson

*Attorney, Agent, or Firm*—Fredric L. Sinder; Thomas L. Kundert

[57] ABSTRACT

A new hybrid gun barrel can be successfully used with modern hotter propellants without unacceptable erosion of the breech section of the gun barrel and while retaining the accuracy and ballistic characteristics of a fully rifled gun barrel. The gun barrel comprises a smooth bore breech section and a longer gain twist rifled muzzle section. The smooth bore breech section can better withstand the high heat and pressure of modern hotter propellants than prior art rifled breech sections. The smooth bore breech section will always be less than one-third the total length of the gun barrel and preferably less than one-fifth the total length of the gun barrel. It can be made of a different material than the rifled muzzle section and can be coated with a material harder than the rest of the gun barrel.

8 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYBRID GUN BARREL

RIGHTS OF THE GOVERNMENT

The invention described herein may be manufactured and used by or for the Government of the United States for all governmental purposes without the payment of any royalty.

BACKGROUND OF THE INVENTION

The present invention relates generally to gun barrels, and more specifically to hybrid gun barrels that can be successfully used with modern hotter propellants.

To successfully pierce modern military armor, the exit velocity, or muzzle velocity, of armor piercing shells fired from modern rapid firing Gatling-like guns, such as the GAU-8 aircraft cannon mounted on the U.S. Air Force A-10 Warthog aircraft, needs to be increased from speeds of about 2500 feet per second (fps) to speeds of about 4000 fps. To achieve these increased speeds, much hotter propellants than are now in use need to be used. Unfortunately, the use of hotter propellants causes much more rapid erosion of the breech end of gun barrels, including the barrel forcing cone where the projectile first enters the gun barrel, than is acceptable for use with rapid firing guns. The erosion and wear results in short barrel lives and decreased gun accuracy.

Conventional gun barrels are rifled along almost their entire length, the rifling originating just forward of the forcing cone. Rifling, spiral grooves cut along the inside of the gun barrel, imparts a spin to a projectile that greatly improves the ballistic characteristics and accuracy of the projectile. Optimum ballistic characteristics of a projectile are particularly important for armor piercing shells because, without the stability imparted by rifling, the projectiles may tumble through the air, even though accuracy might still be maintained. A tumbling projectile may strike armor with its side or back instead of its point and then would not penetrate the armor. Even though rifling causes a great deal of friction against the movement of the projectile through the gun barrel, with the use of modern high performance propellants the stability advantages of rifling have outweighed the higher muzzle velocities that might otherwise be obtainable with a smooth bore gun barrel.

To obtain increased muzzle velocity, the prior art has experimented with a variety of hybrid gun barrels having a rifled breech section and a smooth bore muzzle section. The rifled breech section imparts the desirable spin to the projectile while the smooth bore muzzle section provides higher muzzle velocities. Unfortunately, the rifling on the breech section of the gun barrel still experiences unacceptable erosion and wear if used with the hotter propellants necessary to achieve the needed higher muzzle velocities. Further, while the inventors of these prior art hybrid gun barrels have stated that the accuracy of a fully rifled gun barrel is maintained, the ballistic characteristics, particularly the stability, of projectiles fired by these prior art hybrid gun barrels is suspect.

At least one very early prior art hybrid gun barrel, described in U.S. Pat. No. 37,193 to Alsop, instead of trying to obtain for a modern conventional rifle having a rifled gun barrel some of the advantages of a smooth bore rifle, attempted to obtain for the then more conventional smooth bore gun barrels some of the advantages of a rifled gun barrel. This was done by adding a short rifled tip to the end of a smooth bore gun barrel to impart a last minute spin to the projectile, typically a Minié ball. As noted by modern day inventors, and discussed in U.S. Pat. No. 4,660,312 to A'Costa for a rifled gun barrel having a smooth bore muzzle section, the Alsop gun barrel, if used with modern day ammunition for a rifle, would likely explode when the high velocity projectile suddenly struck the rifling at the end of the gun barrel. If used with a modern armor piercing shell having a rotating band made of a separate material from the rest of the projectile, as is more fully described in the Detailed Description, the rotating band would strip off a high velocity projectile when the projectile struck the rifled tip.

Thus it is seen that there is a need for gun barrels which can withstand the use of modern hotter propellants without unacceptable erosion of the breech end of the gun barrel and which retain the accuracy and stability of fully rifled gun barrels.

It is, therefore, a principal object of the present invention to provide a gun barrel that can withstand the use of hotter propellants without unacceptable erosion of the breech end of the gun barrel while still retaining the accuracy and ballistic characteristics of fully rifled gun barrels.

It is a feature of the present invention that it minimizes the forces on rotating bands from high velocity projectiles fired with hotter propellants.

It is another feature of the present invention that its use of a smooth bore for the breech end of a gun barrel makes it particularly adaptable for use with cased telescoped ammunition.

It is an advantage of the present invention that its use of a smooth bore for the breech end of a gun barrel allows the use of a much greater variety of alternative erosion resistant materials and coatings for the breech end than would be possible if the breech end were rifled.

These and other objects, features and advantages of the present invention will become apparent as the description of certain representative embodiments proceeds.

SUMMARY OF THE INVENTION

The present invention provides a new gun barrel particularly suitable for use with modern hotter propellants without unacceptably rapid erosion of the breech end of the gun barrel. The unique discovery of the present invention is that, because rifling increases the surface area of a gun barrel bore and more heat is deposited into the lands of the rifling than would otherwise occur, too rapid erosion of the breech end of a gun barrel from the use of modern hotter propellants can be avoided, and the accuracy and stability of a rifled gun barrel retained, the use of a hybrid gun barrel having a smooth bore at its breech end in combination with gain twist rifling along a longer rest of the length of the gun barrel. Another unique discovery of the present invention is that the improved erosion resistance of the new hybrid gun barrel is best obtained with the use of cased telescoped ammunition.

Accordingly, the present invention is directed to a gun barrel comprising a smooth bore section at the breech end of the gun barrel and a rifled bore section at the muzzle end of the gun barrel, wherein the pitch of the rifling increases from its beginning nearer the breech end of the gun barrel to its end nearer the muzzle end. The length of the smooth bore section may be less than one-third the total length of the gun barrel. The smooth bore section may be made of a different material than the rifled bore section. The smooth bore section may be coated with a material harder than the rest of the gun barrel.

The present invention is also directed to a gun system comprising a gun barrel including a smooth bore section at the breech end of the gun barrel and a rifled bore section at the muzzle end of the gun barrel, wherein the pitch of the rifling increases from its beginning nearer the breech end of the gun barrel to its end nearer the muzzle end, and a cased telescoped ammunition cartridge. The length of the smooth bore section may be less than one third the total length of the gun barrel. The smooth bore section may be made of a different material than the rifled bore section. The smooth bore section may be coated with a material harder than the rest of the gun barrel.

DESCRIPTION OF THE DRAWINGS

The present invention will be more clearly understood from a reading of the following detailed description in conjunction with the accompanying drawings wherein.

DETAILED DESCRIPTION

Figure 1:
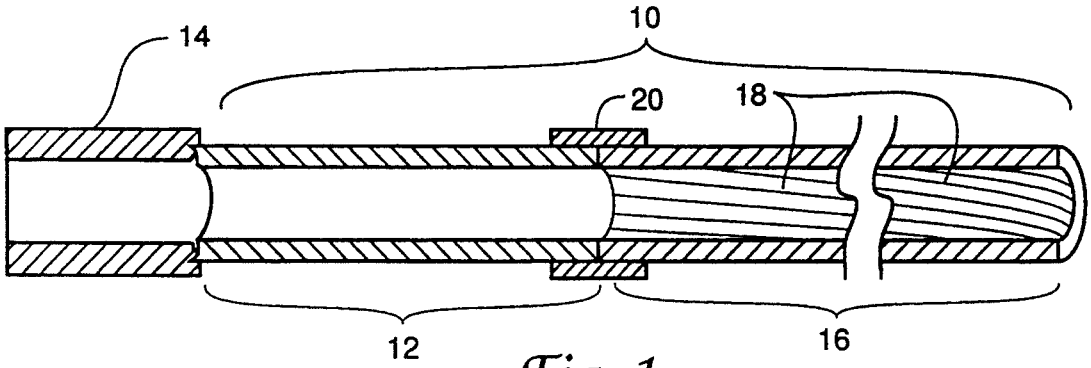
FIG. 1 is a cross-sectional view of a hybrid gun barrel according to the teachings of the present invention showing a smooth bore breech section attached to a longer gain rifled muzzle section.

Referring now to FIG. 1 of the drawings, there is shown a cross-sectional view of a hybrid gun barrel 10 according to the teachings of the present invention. Gun barrel 10 includes a smooth bore breech section 12, which is attached to a breech 14, and a longer gain rifled forward or muzzle section 16 which is gain rifled along its length with gain rifling 18. Breech section 12 is connected to muzzle section 16 by a coupling 20. A threaded sleeve may be used in place of coupling 20. Gain rifling, or gain twist rifling, is rifling in which the pitch of the rifling grooves increases from the breech to the muzzle of the gun barrel. Descriptions of gain twist rifling may be found in U.S. Pat. No. 3,751,313 to Di Benedetto et al., U.S. Pat. No. 3,951,040 to Ziemba, U.S. Pat. No. 4,084,480 to Moscrip, U.S. Pat. No. 4,411,569 to Stroudsburg, U.S. Pat. No. 5,004,529 to Vishnitsky et al., and from other sources.

As used in this description and in the accompanying claims, the term "breech," as in "breech 14," is meant to include only the actual breech or chamber of a gun into which an ammunition cartridge is inserted before firing. The terms "breech section" and "breech end" are meant to indicate that portion of a gun barrel adjacent to the breech.

Figure 2:
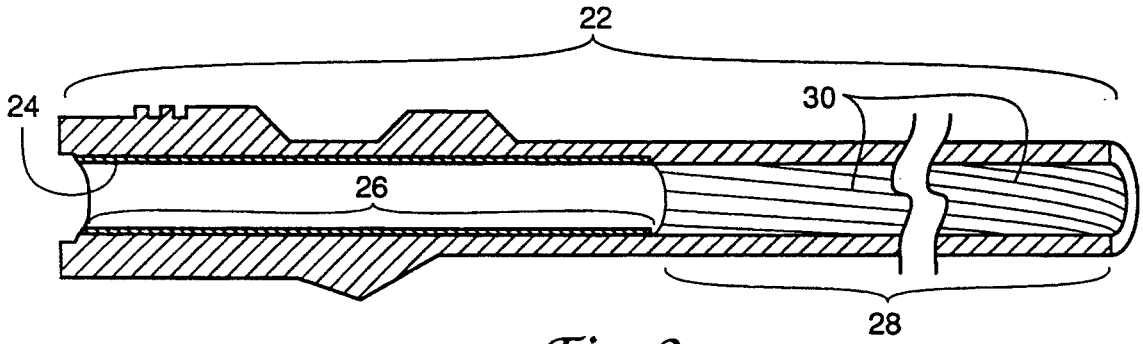
FIG. 2 is a cross-sectional view of another hybrid gun barrel according to the teachings of the present invention showing a smooth bore breech section insert for a gain rifled gun barrel; and, FIG. 3 is a cross-sectional view of an example 25 mm telescoped cartridge case for cased telescoped ammunition.

FIG. 2 shows a cross-sectional view of another hybrid gun barrel 22 according to the teachings of the present invention. Hybrid gun barrel 22 uses a barrel insert 24 for the smooth bore breech section 26. The remaining forward or muzzle section 28 of gun barrel 22 is gain rifled with rifling 30.

Figure 3:
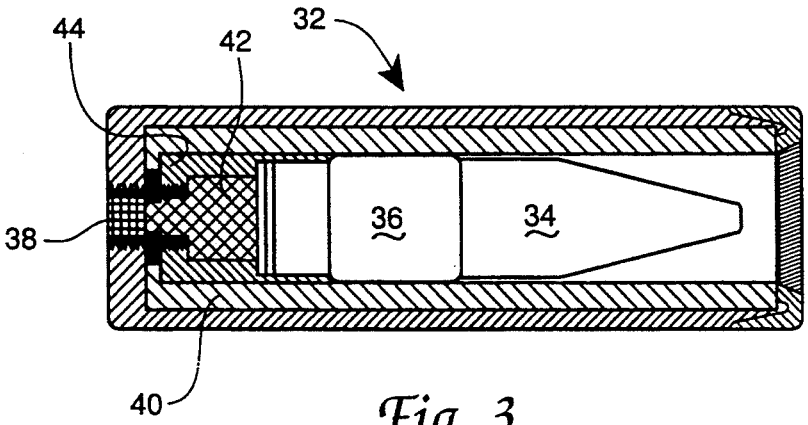
Fig. 3 Prior Art

FIG. 3 is a cross-sectional view of an example 25 mm cased telescoped ammunition cartridge 32. The primary components of cartridge 32 are a projectile 34, a rotating band 36, a primer 38, a main charge 40 and a booster charge 42 enclosed inside a booster housing 42. Cased telescoped ammunition is well-known in the art and, among other advantages over conventional cartridges, is more easily handled and less prone to jamming in rapid fire guns than conventional ammunition. In operation, primer 38 is fired to initiate booster charge 42 which creates hot gases to drive projectile 34 forward out of the cartridge case and into the rear of the gun barrel and against the forcing cone. The hot gases from the burning of booster charge 42 then ignite main charge 40 which produces gas at much higher temperatures and pressures to accelerate the projectile through the gun barrel. The use of a booster charge to first force the projectile against the forcing cone before firing a main charge reduces to some extent the heat and pressure load on the breech end of the gun barrel. Descriptions of cased telescoped ammunition may be found in U.S. Pat. No. 2,866,412 to Meyer et al., U.S. Pat. No. 2,996,988 to Kunz, U.S. Pat. No. 4,197,801 to LaFever et al., U.S. Pat. No. 4,220,089 to Smith, U.S. Pat. No. 4,335,657 to Bains, U.S. Pat. No. 4,604,954 to Clarke et al., U.S Pat. No. 4,938,145 to Martwick, and from other sources.

A rotating band, such as rotating band 36, surrounds nearly all projectiles used in rapid firing guns, particularly for armor piercing shells where the projectile is made of a material, such as tungsten or depleted, uranium which is harder than the steel rifling and which would therefore rapidly erode the rifling. A rotating band made of softer metal or a polymer engages the rifling and transfers the turning forces from the rifling to projectile 34.

In use, projectile 34 is fired from cased telescoped ammunition cartridge 32 into smooth bore breech section 26 of gun barrel 10 where it begins to accelerate. It soon reaches forward or muzzle section 28 where rotating band 36 first engages gain rifling 18 and begins rotating projectile 34. The initial pitch of gain rifling 18 will conventionally be about one turn per hundred inches and the final twist at the muzzle end will conventionally be about one turn per twelve inches. The lower initial pitch reduces the initial force on rotating band 36 so that it is less likely to break free of projectile 34. The final pitch may be reduced from conventional rates because the higher projectile velocities from the use of modern hotter propellants will increase the rotation rate of the projectile. Projectile 34 will accelerate through muzzle section 28 and leave the muzzle end at much higher than usual velocities as a result of using modern hotter propellants.

For a typical 20 mm gun barrel about five feet long, smooth bore breech section 26 will be about one foot long and rifled bore muzzle section 28 will be about four feet long. For a typical 30 mm gun barrel about eight feet long, smooth bore breech section 26 will be about twelve to eighteen inches long and rifled bore muzzle section 28 will be about six to six and one-half feet long. The length of the smooth bore section will always be less than one-third the total length of the gun barrel and preferably less than one-fifth the length of the gun barrel.

Those with skill in the art of the invention will readily see the advantages made possible by the present invention. For example, while a successful prototype hybrid gun barrel has been built made of a 4340 hardened steel alloy, the now smooth bore breech section of the gun barrel no longer has to be made of the same material as the muzzle section, and particularly no longer needs to be made of a material capable of being rifled. The breech section can now be made of harder materials that can better withstand the higher heat and temperatures found at the breech of a gun. Such alternative materials are not limited to metals, but may include ceramics and other materials, particularly when the smooth bore breech section is constructed as an insert as shown in FIG. 2. Similarly, without the requirement that it be rifled, the breech section can be coated with hard coatings that cannot be coated over a rifled surface or which otherwise wear quickly when coated over a rifled surface. Chrome plating, for example, is often used over a rifled surface, but has a short life from the high stresses at the corners of the lands and the grooves of the rifling. A smooth bore will extend the life of such coatings.

The disclosed hybrid gun barrel successfully demonstrates the advantages of a hybrid gun barrel having a smooth bore breech section and a gain rifled muzzle section. Although the disclosed hybrid gun barrel is specialized, its teachings will find application in other areas where requirements for increased performance have increased the dynamic and other loadings on apparatus of long accepted traditional design.

It will be seen by those with skill in the field of the invention that while the rifling will preferably extend to the end of the muzzle, it is not critical that it do so to obtain the advantages of the present invention. Other modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

We claim:

1. A gun barrel having a breech end and a muzzle end, comprising:

(a) a smooth bore section at the breech end of the gun barrel; and, (b) a rifled bore section at the muzzle end of the gun barrel, wherein the pitch of the rifling increases from its beginning nearer the breech end of the gun barrel to its end nearer the muzzle end.

2. The gun barrel according to claim 1, the gun barrel having a total length and the smooth bore section having a length, wherein the length of the smooth bore section is less than one-third the total length of the gun barrel.

3. The gun barrel according to claim 1, wherein the smooth bore section is made of a different material than the rifled bore section.

4. The gun barrel according to claim 1, wherein the smooth bore section is coated with a material harder than the rest of the gun barrel.

5. A gun system, comprising:

(a) a gun barrel having a breech end and a muzzle end, including:

(i) a smooth bore section at the breech end of the gun barrel; and, (ii) a rifled bore section at the muzzle end of the gun barrel, wherein the pitch of the rifling increases from its beginning nearer the breech end of the gun barrel to its end nearer the muzzle end; and, (b) a case telescoped ammunition cartridge.

6. The gun system according to claim 5, the gun barrel having a total length and the smooth bore section having a length, wherein the length of the smooth bore section is less than one-third the total length of the gun barrel.

7. The gun system according to claim 5, wherein the smooth bore section is made of a different material than the rifled bore section.

8. The gun system according to claim 5, wherein the smooth bore section is coated with a material harder than the rest of the gun barrel.

* * * * *